Nov. 18, 1952     H. B. FECHTER     2,618,185
MATERIAL STRAIGHTENING TOOL
Filed July 19, 1951
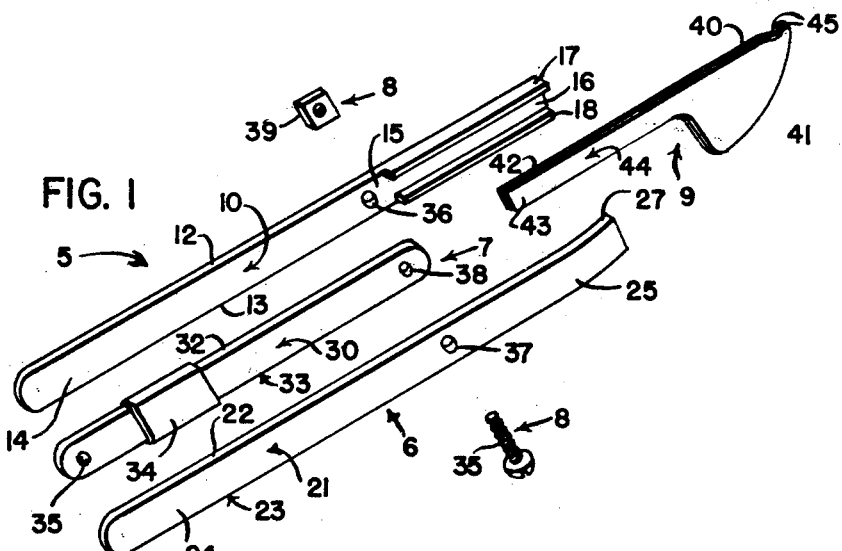
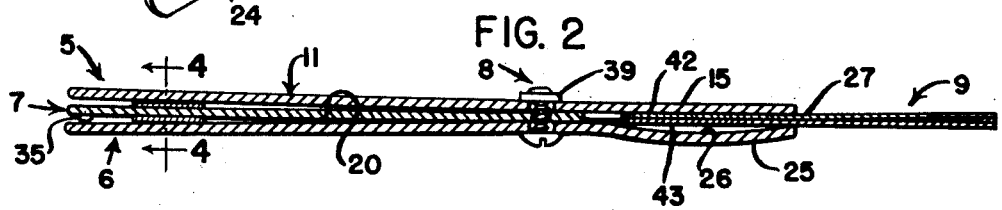
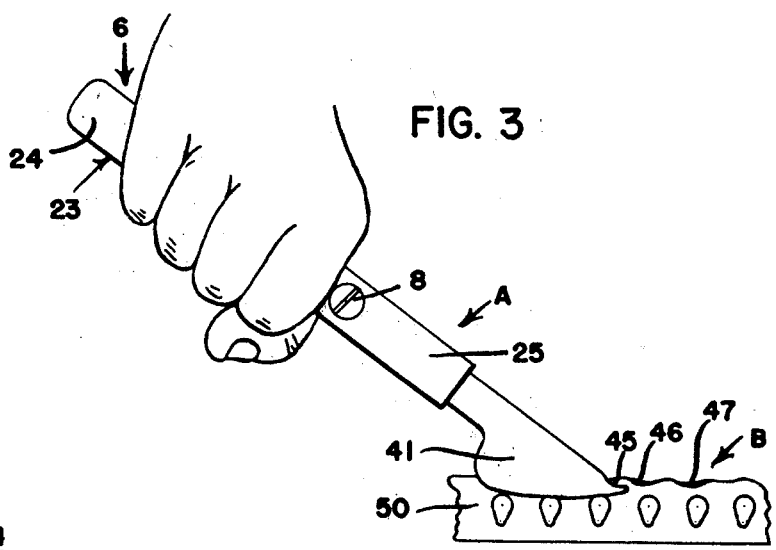
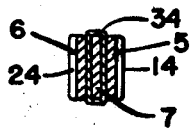
Inventor
Harry B. Fechter
By Lancaster, Allwine & Rommel
Attorney Patented Nov. 18, 1952

2,618,185

UNITED STATES PATENT OFFICE 2,618,185

MATERIAL STRAIGHTENING TOOL

Harry B. Fechter, Minneapolis, Minn.

Application July 19, 1951, Serial No. 237,601

5 Claims. (Cl. 81—15)

This invention relates to tools for flattening sheet material and more specifically to a tool for straightening the bent or distorted edge portions of thin sheet metal and the like by a rocking and canting of the tool. An example of the use of the tool is in straightening bent and distorted fins of automobile radiators.

An important object of the invention is to provide such a tool, adjustable to the thickness of the sheet material, such as fins of different thicknesses.

Another important object is to provide a tool for the purpose which tool is easily held in the hand and readily manipulated.

Still another important object is to provide a handle and a pair of blades, the blades being readily removable from the handle.

Other objects and advantages of the invention will be apparent during the course of the following detailed description of the invention, taken in connection with the accompanying drawing, forming a part of this disclosure and in which drawing:

Figure 1 is an exploded view showing the parts of the new tool in perspective.

Figure 2 is a longitudinal section of the new tool.

Figure 3 is a view showing one application of the new tool.

Figure 4 is a transverse section, substantially on the line 4—4 of Figure 2.

In the drawing wherein for the purpose of illustration is shown a preferred embodiment of the invention and wherein similar reference characters designate corresponding parts throughout the several views, the letter A designates the new tool and the letter B, a device containing a portion of sheet material being straightened.

The new tool A comprises a first combined handle and blade assembly-retaining portion 5, a second combined handle and blade assembly-retaining portion 6, adjustable means 7 for causing the portions 5 and 6 to grip the blade assembly, means 8 pivotally connecting the portions 5 and 6 and a portion of the means 7, and blade assembly 9.

Preferably, the combined handle and blade assembly-retaining portion 5 is a substantially straight, elongated, rigid length of suitable material, having a smooth inner face 10 opposite the outer or hand-gripping face 11, and narrow edges 12 and 13 normal to the faces 10 and 11. The end part 14 of the portions 5 constitutes a handle and also cooperates with the means 7 to be substantially described. The opposite end part 15 is provided with an elongated groove 16 such as by having a pair of spaced-apart flanges 17 and 18 extending in substantial parallelism from the face 10. This groove extends to the very end of the part 15.

The combined handle and blade assembly-retaining portion 6 is an elongated, generally fairly rigid length of suitable material, but having some slight resiliency, and has a smooth inner face 20 opposite the outer face 21 and narrow edges 22 and 23 normal to the edges 20 and 21. The handle part 24 is substantially like the part 14 but the opposite part 25 is slightly bowed as at 26 and has an inwardly-extending terminal edge 27 adapted to bear against a part of the blade assembly 9. The portions 5 and 6 are preferably of the same length.

Adjustable means 7 for causing the portions 5 and 6 to grip the blade assembly 9 includes a substantially straight body or length of suitable rigid material, shorter than the portions 5 and 6 and having opposite smooth faces 30 and 31 and edges 32 and 33 like the edges 12 and 13 and 22 and 23. A short slide or adjusting member 34 is carried by the length of material and adapted to slide longitudinally of this length. A suitable projection 35 limits the movement of the member 34 in one direction.

The portions 5 and 6 and the adjustable means 7 may be of steel or iron. Means 8 for pivotally connecting the portions 5 and 6 and length forming part of the means 7 may be a bolt and nut assembly, with the shank 35 of the bolt extending loosely through suitable axially aligned openings 36, 37 and 38 in the intermediate parts of the portions 5 and 6 and adjacent the end part of the length of material forming part of the means 7, with the nut 39 screwed upon the protruding free end of the shank 35. The openings 36 and 37 are somewhat larger in diameter than the diameter of the shank 35.

The blade assembly 9 comprises a pair of superimposed blades 40 and 41 preferably of strong rigid material, as steel, joined together at their reduced inner end parts 42 and 43 (as by welding or soldering) and these end parts 42 and 43 slide snugly into the groove 16. The side face 44 of the end part 43 extends slightly beyond the planes of the edges of the flanges 17 and 18. The outer or free end portions of the blades 40 and 41 are provided with curved depressions 45 to enable the operator to rock the tips of the blades under the bent-over portion of a fin and raise the bent-over portion.

When the parts of the new tool are assembled as in Figures 2 and 3, the extent that the slide 34 is moved longitudinally of the faces 30 and 31 governs the degree of gripping of the handle portions 5 and 6 upon the blade assembly 9 since these handle portions may rock slightly. The edge 27 grips the face 44 of the blade assembly and there is a firm gripping and retaining of the blade assembly possible. Of course, the entire means 7 may be swung or pivoted in order to render it free for adjustment of the slide 34.

In use the fin 50 of the device B may be bent or doubled over as at 46 and 47 and, as the fin is inserted between the blades 40 and 41, they may be rocked forwardly and/or rearwardly, or canted from side to side for the purpose of straightening the fin.

Various changes may be made to the form of the invention herein shown and described without departing from the spirit of the invention or scope of the claims.

What is claimed is:

1. A hand tool for straightening deformed sheet material, including two portions, each including a handle part and a blade-gripping part rigid therewith, a blade assembly including a pair of superimposed blades having reduced inner end parts rigid therewith, and interconnected at said reduced end parts, means for moving the blade-gripping parts toward and away from each other and into gripping contact with said reduced inner end parts; and means interconnecting said portions.

2. A hand tool according to claim 1 characterized in that one of said blade-gripping parts has a groove receiving a portion of said reduced inner end parts with other portions of said reduced inner end parts extending outwardly of the plane of the mouth of said groove, and the other blade-gripping part has a bowed part bearing against one of said reduced inner end parts.

3. A hand tool according to claim 1 characterized in that one of said blade-gripping parts has a pair of flanges defining, with adjacent parts of said one of said blade-gripping parts, a groove receiving a portion of said reduced inner end parts with other portions of said reduced inner end parts extending outwardly of the plane of the mouth of said groove, and the other blade-gripping part has a bowed part bearing against one of said reduced inner end parts.

4. A hand tool according to claim 1 characterized in that the first-mentioned means includes a slide manually movable toward and away from said blade-gripping parts and extending between said handle parts, and said portions being loosely interconnected by pivot means.

5. A hand tool according to claim 1 characterized in that the first-mentioned means comprises an elongated body and a slide mounted upon and manually movable longitudinally along said body for movement towards and away from said blade-gripping parts, said slide and body being normally disposed between said handle parts, and said portions and body being loosely interconnected by pivot means.

HARRY B. FECHTER.

REFERENCES CITED

The following references are of record in the file of this patent:

UNITED STATES PATENTS

| Number | Name | Date |
|---|---|---|
| 573,574 | Davies | Dec. 22, 1896 |
| 1,575,576 | Guitan | Mar. 2, 1926 |
| 2,222,081 | Leigh | Nov. 19, 1940 |